(12) United States Patent
Bleiner et al.

(10) Patent No.: US 7,815,344 B2
(45) Date of Patent: Oct. 19, 2010

(54) DEVICE AND METHOD FOR HIGH VISIBILITY EMERGENCY SIGNALING

(76) Inventors: Thomas Bleiner, 16 Via Dei Camuzzi, Montagnola (CH) 6926; Bruno Dussert-Vidalet, 44 Via Volto, Longare (IT) 36023

( * ) Notice: Subject to any disclaimer, the term of this patent is extended or adjusted under 35 U.S.C. 154(b) by 600 days.

(21) Appl. No.: 11/577,195

(22) PCT Filed: Oct. 21, 2005

(86) PCT No.: PCT/IB2005/003149
§ 371 (c)(1), (2), (4) Date: Aug. 4, 2007

(87) PCT Pub. No.: WO2006/092653
PCT Pub. Date: Sep. 8, 2006

(65) Prior Publication Data
US 2008/0088470 A1  Apr. 17, 2008

(30) Foreign Application Priority Data
Oct. 22, 2004  (IT) .......................... VI2004A0251

(51) Int. Cl.
*F21V 3/00* (2006.01)
*F21V 5/00* (2006.01)
(52) U.S. Cl. .............. 362/311.1; 340/815.4; 340/815.5; 340/815.54; 340/815.57; 362/268; 362/516; 362/517; 362/520; 362/560
(58) Field of Classification Search ............... 340/7.5, 340/7.61, 815.54, 815.55, 815.57, 815.73–815.76; 362/268, 493, 499, 540, 542, 299–303
See application file for complete search history.

(56) References Cited

U.S. PATENT DOCUMENTS

| | | | |
|---|---|---|---|
| 4,195,328 A | 3/1980 | Harris, Jr. | |
| 5,134,550 A * | 7/1992 | Young | 362/560 |
| 5,463,538 A | 10/1995 | Womack | |
| 5,642,933 A * | 7/1997 | Hitora | 362/243 |
| 5,667,292 A | 9/1997 | Sabalvaro, Jr. | |
| 5,688,039 A | 11/1997 | Johnson | |
| 5,694,112 A | 12/1997 | Vannrox et al. | |
| 5,758,947 A | 6/1998 | Glatt | |
| 5,929,788 A | 7/1999 | Vukosic et al. | |
| 6,086,218 A * | 7/2000 | Robertson | 362/157 |
| 6,183,100 B1 * | 2/2001 | Suckow et al. | 362/35 |
| 6,302,558 B1 | 10/2001 | Parks | |
| 6,364,506 B1 * | 4/2002 | Gallo | 362/245 |
| 6,461,015 B1 | 10/2002 | Welch | |

(Continued)

FOREIGN PATENT DOCUMENTS

DE    202004006855    7/2004

(Continued)

*Primary Examiner*—Daniel Wu
*Assistant Examiner*—Son M Tang
(74) *Attorney, Agent, or Firm*—Themis Law

(57) ABSTRACT

A high visibility emergency signaling device includes a base configured to be secured to an external support raised above ground level, light-emitting means mounted thereto for generating at least one light beam, and power supply means for such light-emitting means. Optical means are further provided, operating on the at least one light beam to model and orient it in such a manner as to illuminate a substantially circular area in space and/or on the ground.

19 Claims, 4 Drawing Sheets

U.S. PATENT DOCUMENTS

| | | | |
|---|---|---|---|
| 6,533,446 B2 * | 3/2003 | Chen et al. | 362/559 |
| 6,543,911 B1 * | 4/2003 | Rizkin et al. | 362/307 |
| 7,021,801 B2 * | 4/2006 | Mohacsi | 362/477 |
| 7,111,958 B2 * | 9/2006 | Coman | 362/153.1 |
| 7,168,827 B2 * | 1/2007 | Stein et al. | 362/299 |
| 7,293,908 B2 * | 11/2007 | Beeson et al. | 362/612 |
| 7,425,084 B2 * | 9/2008 | Ruud et al. | 362/298 |
| 7,572,030 B2 * | 8/2009 | Booth et al. | 362/245 |

FOREIGN PATENT DOCUMENTS

| | | |
|---|---|---|
| GB | 2372091 | 8/2002 |
| WO | 2004002779 | 4/2007 |

* cited by examiner

DEVICE AND METHOD FOR HIGH VISIBILITY EMERGENCY SIGNALING

FIELD OF THE INVENTION

This invention finds application in the field of road safety and particularly relates to an emergency signaling device.

The invention further relates to a process for providing emergency signaling.

STATE OF THE ART

Oftentimes, personnel and equipment carrying out safety and maintenance tasks on a roadway operate in poorly signaled, low-visibility environments.

For example, highway maintenance personnel often work at night, and may have to operate in non-illuminated road sections.

Furthermore, workers that ordinarily operate in emergency situations, such as firemen, work every day in "difficult" environments.

The risk is for these persons and equipment to be run over by any vehicle, whose driver would not see them due to carelessness or distraction.

Such personnel is typically equipped with retroreflective apparel and devices.

These have the drawback of only being visible when hit by direct light, which might occur too late, considering for instance the case of a high speed vehicle. Furthermore, such clothing are less visible in low light conditions, such as under rain, snow or fog.

In an attempt to overcome these drawbacks, devices have been proposed which use one or more light-emitting sources.

U.S. Pat. No. 6,461,015 discloses and claims an example of these prior art solutions: a wearable device which comprises a rotating strobe lamp viewable from 360°.

While this device can highlight an operator or an operator vehicle from a distance, it still has drawbacks: in bad weather conditions, it is nearly useless.

Furthermore, light rotation occurs by mechanical means. Hence, such device is subjected to early wear, thereby involving higher costs for service and replacement of worn parts.

Also, incandescent lamps have a high power consumption, whereby the device is expensive and poorly cost-effective.

Other exemplary solutions using incandescent lamps are disclosed in U.S. Pat. Nos. 5,463,538 and 5,667,292.

A progress toward the solution of this problem has been the use of laser light, which is known to be able to materialize persistent atmospheric suspension.

WO2004/002779 discloses an emergency visual signaling device which provides rotating beacon signaling using laser light. Nevertheless, motion imparting components are of the mechanical type.

Thus, this solution overcomes only some of the above drawbacks. Although it uses a laser source that is viewable from a long distance and in bad weather conditions, it still has all the limitations associated to devices that use mechanical parts.

U.S. Pat. No. 5,758,947 discloses a safety helmet having a plurality of light emitting diodes, or LEDS, or laser diodes.

Similar solutions have been disclosed in U.S. Pat. Nos. 5,688,039, 4,195,328, 6,302,558.

One limitation of these solutions is that, while the wearer is viewable from a long distance even in poor visibility conditions, his/her position is not easily locatable.

Laser diodes are arranged in such a manner that the beams emitted thereby are radial to the helmet, which confuses the viewer, especially in very bad weather conditions.

Furthermore, if several people wear the same helmet within a short range, as is often the case with workers' teams in highways, crossed beams can generate a confusion which does not allow to distinguish the individual workers.

This may be even endanger those, e.g. the firemen, who operate in places and situations in which clearly locating people and things is of the utmost importance.

These prior art solutions further use a great number of diodes and have a high power absorption, which makes them useless on case of long-lasting interventions and works.

SUMMARY OF THE INVENTION

The object of this invention is to overcome the above drawbacks, by providing a multifunction signaling device, particularly for emergency signaling, which achieves high reliability and has a relatively simple construction.

A particular object is to provide a device which is capable of clearly highlighting, from a long distance, a safety area beneath and/or around the device.

A further object is to provide a device that is clearly viewable from a long distance, even by rain, snow, hail or fog conditions.

Another object is to propose a process which provides rotating beacon signaling without using mechanical moving parts.

Yet another object of the invention is to provide a device that has a small size, low manufacturing costs and low power consumption.

These objects, as well as other objects that will be more apparent hereafter, are fulfilled by a high visibility emergency signaling device as defined in claim 1, comprising a base to be secured to an external support raised above ground level, light-emitting means mounted thereto for generating at least one light beam power supply means for such light-emitting means, characterized in that it comprises optical means operating on said at least one light beam to model and orient it in such a manner as to illuminate a substantially circular area in space and/or on the ground.

Thanks to this particular configuration, the inventive device will be capable of highlighting a safety area beneath and/or around the device.

The optical means may include a convex mirror opposite the light-emitting means, whose convexity faces toward the latter.

The convex mirror may have a semispherical shape.

The convex semispherical mirror may have at least two semispherical portions, superimposed and geometrically aligned to each other, having different radiuses of curvature.

Furthermore the modeling means may include at least one prism placed in the optical path of the beam.

In accordance with a further aspect of the invention, a process is proposed for providing visual emergency signaling, as defined in claim 17, characterized in that it comprises the following steps: providing a base to be secured to an external support raised above ground level, providing light-emitting means on said base for generating at least one light beam, arranging said light-emitting means on said base to define a substantially circular area, said light-emitting means being provided in a predetermined number, placing optical means in the optical path of said at least one light beam to model and orient it in such a manner as to illuminate a substantially circular area in space and/or on the ground, connecting said light-emitting means to power supply means, and sequentially supplying power to said light-emitting means, each of them being individually powered during a predetermined time, while the remaining light-emitting means are not powered.

BRIEF DESCRIPTION OF THE DRAWINGS

Further features and advantages of the invention will be more apparent from the detailed description of a preferred, non-exclusive embodiment of a device according to the invention, which is described as a non-limiting example with the help of the annexed drawings, in which.

DETAILED DESCRIPTION OF A PREFERRED EMBODIMENT

Figure 1:
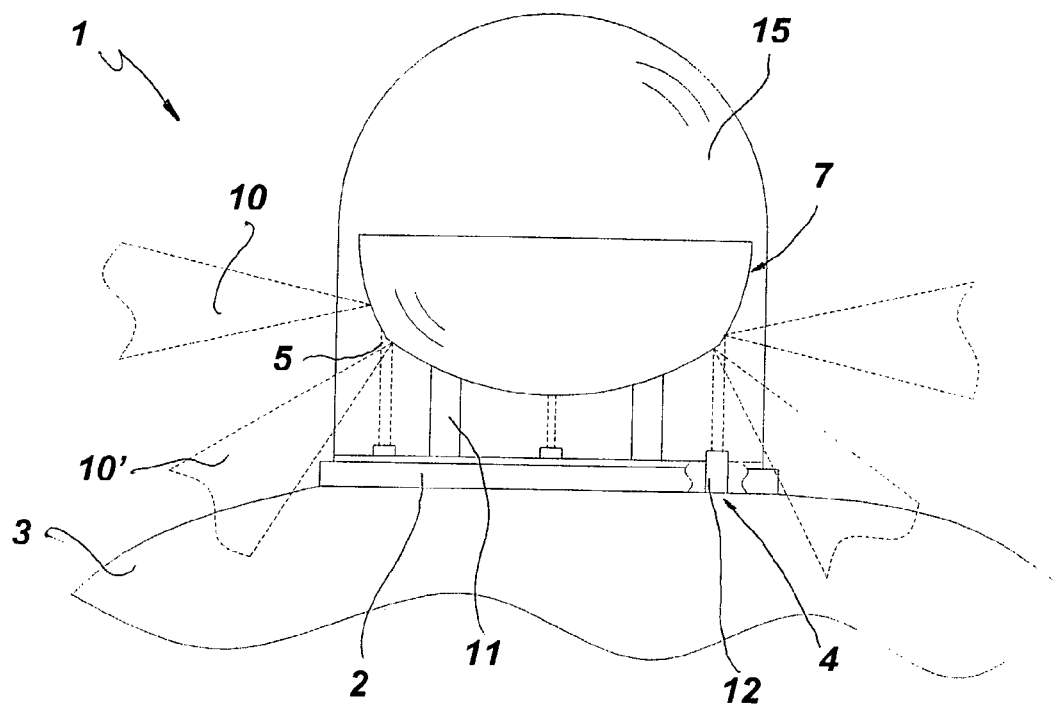
FIG. 1 is a diagrammatic view of the device assembly according to the invention.
Figure 2:
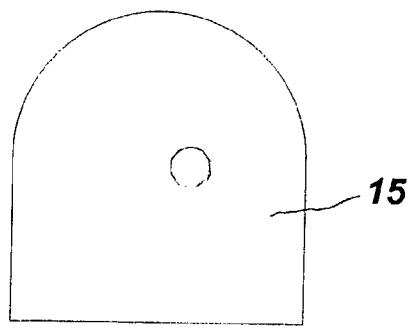
FIG. 2 is a diagrammatic exploded view of a detail of the device according to the invention.
Figure 2:
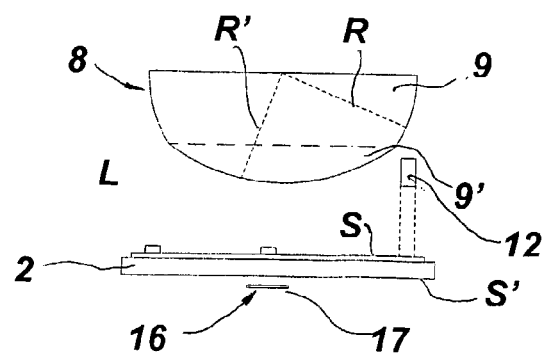
Figure 3:
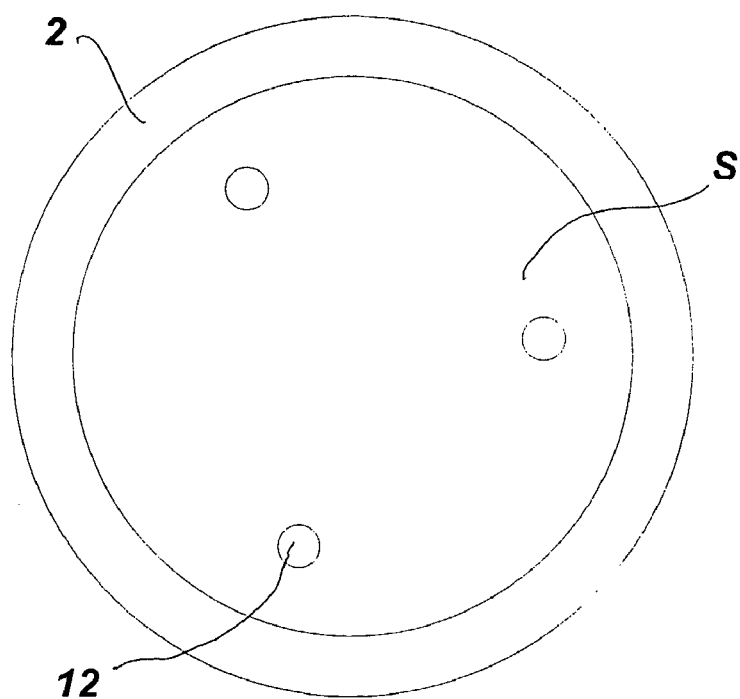
FIG. 3 is a diagrammatic top view of a detail of FIG. 2.
Figure 4:
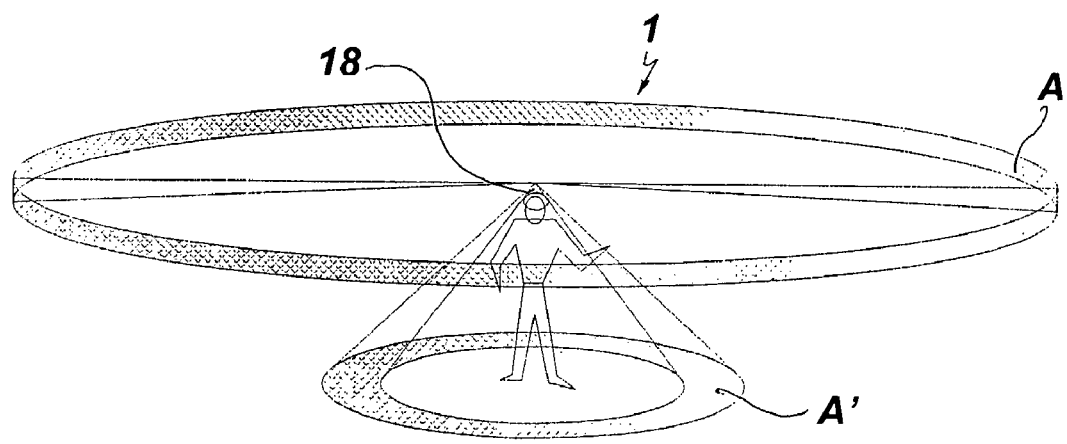
FIG. 4 is a diagrammatic view of an application of the device according to the invention.

Referring to the above figures, the device of the invention, which is generally designated by numeral 1, is essentially composed of a base 2, to be secured to an external support 3, light-emitting means 4 being mounted thereto for generating a light beam 5.

The light emitting means 3 are powered by power supply means 6.

According to the invention, optical means 7 are provided, operating on the light beam 5 to model and orient it in such a manner as to illuminate a substantially circular area in space A and/or on the ground A'.

By this arrangement, a safety area will be actually defined around the device, regardless of whether the illuminated area is in space A, on the ground A', or both. If both areas are illuminated, the device will be particularly effective, as it will simultaneously highlight a ring in space and a circular protection area on the ground.

Mirrors or prisms may be used for proper configuration of the beam 5.

Conveniently, the optical means 7 may comprise a convex mirror 8 placed in front of the light emitting means 4 with its convexity facing toward them.

Thanks to this arrangement, the beam 5 generated by the light emitting means 4, which hits the mirror 8, will be appropriately reflected to provide the above mentioned signaling. The beam 5 will obviously have various orientations depending on the radius of curvature R of the mirror 8.

Advantageously, the mirror 8 may be of the semispherical type, and have at least two semispherical portions 9 and 9', superimposed and geometrically aligned to each other, having different radiuses of curvature R and R'.

By conveniently positioning the light emitting means 4, so that the beam 5 generated thereby impacts the separation line L between the two portions 9 and 9', the same beam 5 will generate two reflected beams 10 and 10' having different orientations.

Proper selection of the radiuses of curvature R and R' will provide beams that illuminate different areas: for example, it may provide a beam 10 that illuminates a substantially circular area in space, parallel to the bearing surface for the support 3, and a downward beam 10' illuminating the area underlying the support 3 itself.

In another configuration, the same effect may be obtained by using optical prisms to suitably deviate the beam 5.

Suitable stands 11 may be obviously used to maintain the mirror 8 in a proper position.

Advantageously, the light-emitting means 4 may include at least one projector 12 having semiconductor light sources 13, preferably of the laser or LED type.

In one preferred configuration, there may be provided three sources 13, arranged over the base 2 at 120° from each other.

The use of a laser or LED source adds advantages to the device 1: this kind of light is well visible under bad weather conditions, so that signaling thereby may be effective even under rain, snow or fog.

Also, it has the property of materializing persistent atmospheric suspension so that, in the above conditions, a beam 10 projected in the space A will actually form a protection disk, and/or a beam 10' projected over the area A' will actually form a safety barrier.

As a result, especially in the configuration where the mirror 8 has different radiuses of curvature R and R', hence with the beam 4 being reflected both in A and A', signaling provided by the device 1 has a maximized effectiveness.

Furthermore, in high visibility conditions, light projection will be more visible than that obtained using traditional light sources, thanks to the higher sensitivity of human vision to laser sources.

Furthermore, as is known, the semiconductor source has a lower power absorption than an incandescent source.

Advantageously, the projector 12 may be equipped with control means 14, preferably comprising a microprocessor unit interposed between the power supply means 6 and the source 13.

Thanks to its small size and consequent minimized space requirements, the device 1 is particularly suitable for nighttime emergency signaling on roads and highways, which require the highest possible visibility, to prevent injuries and damages to persons and properties.

Therefore, the power supply means 6 may include a battery or an accumulator, whereby the device 1 may be used where the mains is not available, as is usually the case in the above mentioned places.

In terms of construction, the light-emitting means 4 may be mounted to the top surface S of the base 2, which will further support the mirror 8 and a protection dome 15.

The base 2 will further have a bottom surface S' having connection means 16 for removable attachment to the support 3.

These connection means will preferably include a magnet 17, allowing to attach the device 1 to a metal surface, such as the roof of a disabled motor vehicle.

In another preferred configuration, the means 16 allow the device 1 to be attached to a cap or helmet 18, and provide a small size, practical wearable safety structure, which can avoid any injury to the wearer by highly effective signaling.

Figure 5:
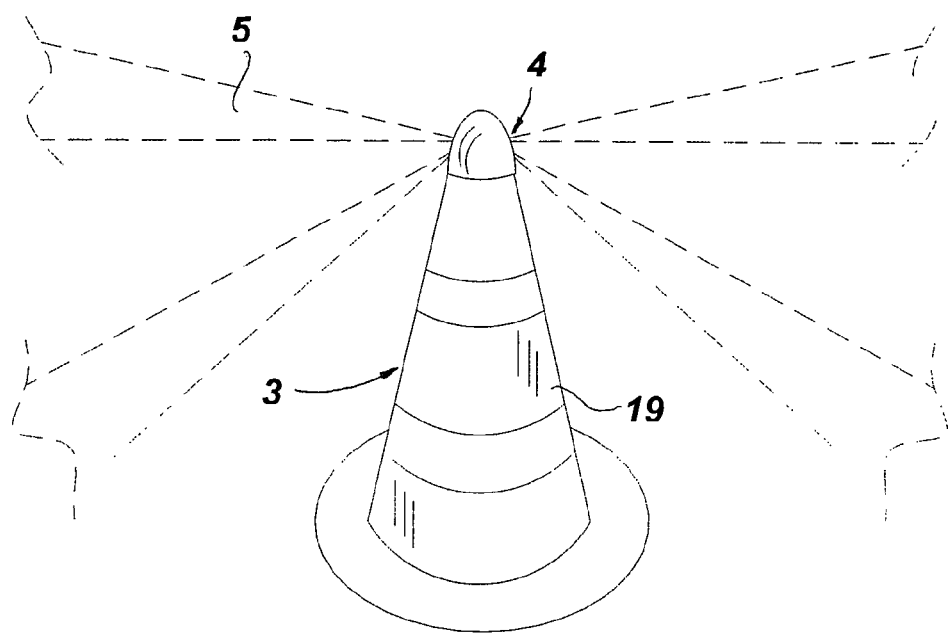
FIG. 5 is an axonometric view of an application of the device according to the invention.
Figure 6:
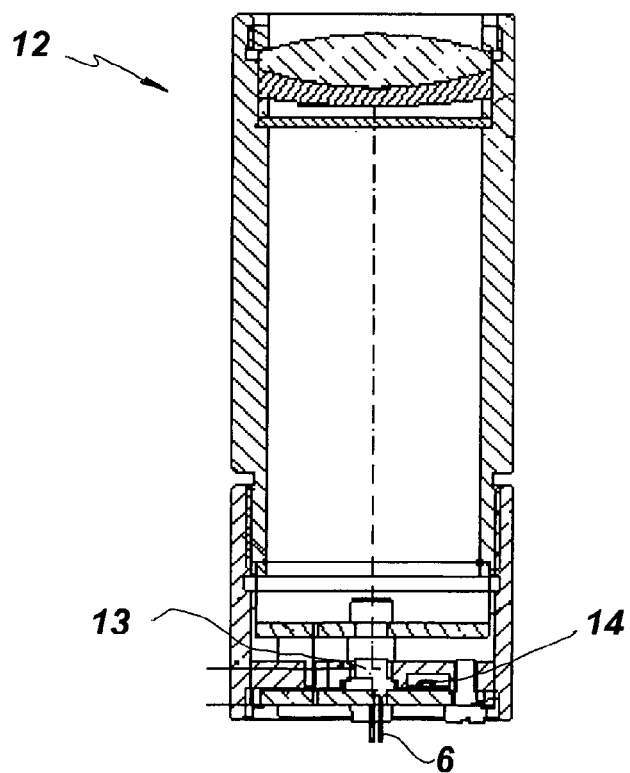
FIG. 6 is a plan view of a detail of the device according to the invention.
Figure 7:
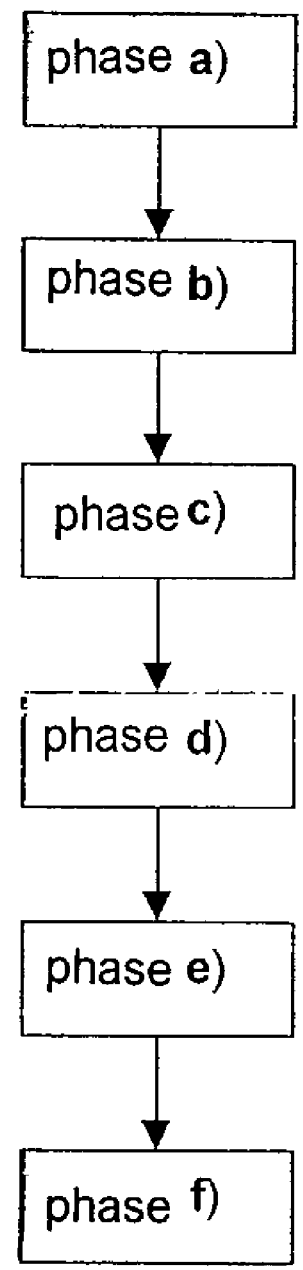
FIG. 7 shows a flowchart of the process for providing signaling according to the invention.

In a preferred configuration, the connection means 16 may allow the device 1 to be attached to a traffic cone 19, as shown in FIG. 5.

A process for providing high visibility visual emergency signaling includes the following steps.

First, in steps a) and b) a base 2 and light-emitting means 4 are provided, both having the above features.

These steps are followed by a step c) in which the light-emitting means 4 are arranged over the base 2 to define a substantially circular area.

In step d), optical means 7 are placed in the optical path of the light beam 5 as described above.

Then, in step e) the means 4 are connected to the means 6.

The final step is step f) in which the light-emitting means 4 are sequentially powered.

This process provides rotating beacon type signaling, with the advantage that no mechanical moving parts are provided, which affords a higher signaling effectiveness, and a lower risk of signaling failure due to wear of mutually rotating parts.

The above disclosure shows that the inventive device fulfils the proposed objects, and particularly the object of highlighting a safety area beneath and/or around the device.

Thanks to the optical means 8 highly effective and visible signaling may be obtained.

The device of this invention is susceptible to a number of changes and variants, within the inventive concept disclosed in the appended claims. All the details thereof may be replaced by other technically equivalent parts, and the materials may vary depending on different needs, without departure from the scope of the invention.

While the device has been described with particular reference to the accompanying figures, the numerals referred to in the disclosure and claims are only used for the sake of a better intelligibility of the invention and shall not be intended to limit the claimed scope in any manner.

What is claimed is:

1. A high visibility emergency signaling device, comprising:
    a base configured to be secured to an external support raised above ground level;
    light-emitting means mounted to said base for generating at least one light beam;
    power supply means for the light-emitting means; and
    optical means operating on said at least one light beam to model and orient it in such a manner as to illuminate at least one circular area in space and at least one circular area on the ground,
    wherein said optical means comprise at least two different coaxial convexities facing said light-emitting means.

2. A device as claimed in claim 1, wherein said optical means comprise a mirror.

3. The device as claimed in claim 2, wherein said at least two different coaxial convexities are defined by spherical segments.

4. The device as claimed in claim 3, wherein said spherical segments comprise a spherical slice and a spherical cap superimposed and coaxially aligned with each other, said spherical segments having different radiuses of curvature.

5. The device as claimed in claim 1, wherein said light-emitting means comprise at least one projector with a semiconductor light source connected to said power supply means.

6. The device as claimed in claim 5, wherein said semiconductor source is of the laser or LED type.

7. The device as claimed in claim 5 further comprising control means for controlling said at least one projector.

8. The device as claimed in claim 7, wherein said control means comprise a microprocessor unit interposed between said power supply means and said at least one semiconductor source.

9. The device as claimed in claim 1, wherein said power supply means comprise at least one battery or an accumulator.

10. The device as claimed in claim 1, wherein said base has one top surface configured for supporting said light-emitting means and one bottom surface having connection means for removable attachment to said external support.

11. The device as claimed in claim 10, wherein said connection means comprise at least one magnet.

12. The device as claimed in claim 10, wherein said support has at least one metal portion.

13. The device as claimed in claim 10, whereon said support includes one helmet.

14. The device as claimed in claim 10, wherein said support includes one part of a vehicle.

15. The device as claimed in claim 10, wherein said support includes one traffic cone.

16. A process of providing high visibility visual emergency signaling comprising the following steps:
    a) providing a base configured to be secured to an external support raised above ground level;
    b) providing light-emitting means for generating at least one light beam (5);
    c) arranging said light-emitting means on said base to define a substantially circular area, said light-emitting means being provided in a predetermined number;
    d) placing optical means in the optical path of said least one light beam to model and orient it in such a manner as to illuminate at least one substantially circular area in space and at least one substantially circular area on the ground, said optical means comprising at least two different coaxial convexities facing said light-emitting means;
    e) connecting said light-emitting means to the power supply means; and
    f) sequentially supplying power to said light-emitting means, each of the light-emitting means being individually powered during a predetermined time, while the remaining light-emitting means are not powered.

17. The process as claimed in claim 16, wherein said optical means comprise a mirror.

18. The process as claimed in claim 17, wherein said at least two different coaxial convexities are defined by spherical segments.

19. The process as claimed in claim 18, wherein said spherical segments comprise a spherical slice and a spherical cap superimposed and coaxially aligned with each other, said spherical segments having different radiuses of curvature.

* * * * *